United States Patent
Lambert et al.

(10) Patent No.: US 7,675,296 B2
(45) Date of Patent: Mar. 9, 2010

(54) METHOD AND APPARATUS FOR DETECTING THE HEAD POSE OF A VEHICLE OCCUPANT

(75) Inventors: David K. Lambert, Sterling Heights, MI (US); Timothy J. Newman, Noblesville, IN (US); Larry M. Oberdier, Royal Oak, MI (US)

(73) Assignee: Delphi Technologies, Inc., Troy, MI (US)

( * ) Notice: Subject to any disclaimer, the term of this patent is extended or adjusted under 35 U.S.C. 154(b) by 766 days.

(21) Appl. No.: 11/519,043

(22) Filed: Sep. 11, 2006

(65) Prior Publication Data

US 2008/0060497 A1 Mar. 13, 2008

(51) Int. Cl.
G01R 27/26 (2006.01)
B60K 28/00 (2006.01)
G08B 23/00 (2006.01)

(52) U.S. Cl. ............ 324/687; 324/686; 180/272; 340/575; 340/576

(58) Field of Classification Search ............ 324/687; 340/575, 576; 180/272
See application file for complete search history.

(56) References Cited

U.S. PATENT DOCUMENTS

| | | | |
|---|---|---|---|
| 5,598,153 A | | 1/1997 | Brasseur et al. |
| 5,602,734 A | * | 2/1997 | Kithil ............... 180/282 |
| 5,691,693 A | * | 11/1997 | Kithil ............... 180/272 |
| 5,802,479 A | * | 9/1998 | Kithil et al. ......... 324/688 |
| 5,871,232 A | * | 2/1999 | White .............. 280/735 |
| 6,014,602 A | * | 1/2000 | Kithil et al. ......... 180/272 |
| 6,025,726 A | * | 2/2000 | Gershenfeld et al. .... 324/687 |
| 6,275,146 B1 | * | 8/2001 | Kithil et al. ........... 180/272 |
| 6,402,195 B1 | * | 6/2002 | Eisenmann et al. ..... 280/735 |
| 6,469,524 B1 | | 10/2002 | Oberdier |
| 6,552,550 B2 | * | 4/2003 | Karray et al. ......... 324/662 |
| 6,693,442 B2 | * | 2/2004 | Karray et al. ......... 324/662 |
| 6,794,728 B1 | * | 9/2004 | Kithil ............... 257/532 |

FOREIGN PATENT DOCUMENTS

| | | |
|---|---|---|
| DE | 199 16 804 | 8/2000 |
| WO | 96/09193 | 3/1996 |
| WO | 97/11862 | 4/1997 |
| WO | 98/31571 | 7/1998 |

OTHER PUBLICATIONS

European Search Report dated Jun. 19, 2008.
Zimmerman et al., Applying Electric Field Sensing to Human-Computer Interfaces, Conf. on Human Factors in Computing Systems, Denver CO, pp. 280-287, 1995.
Baxter, Capacitive Sensors: Design and Application, pp. 88-90, Published by IEEE Inc., 1997.

* cited by examiner

*Primary Examiner*—Timothy J Dole
(74) *Attorney, Agent, or Firm*—Jimmy L. Funke (57) ABSTRACT

Driver distraction in a motor vehicle is assessed by capacitively detecting the driver's head pose relative to the forward direction of vehicle motion. A symmetrical array of sensor electrodes is disposed in the cockpit ceiling above the driver's head, and pairs of electrodes disposed along varying axes of rotation with respect to the forward direction are successively activated for capacitance measurement. The capacitance measurements are combined to form a signal whose strength depends on the degree of alignment between the driver's head (i.e., the head pose) and the respective axes of rotation, and the driver's head pose is calculated to assess driver distraction.

17 Claims, 8 Drawing Sheets

METHOD AND APPARATUS FOR DETECTING THE HEAD POSE OF A VEHICLE OCCUPANT

TECHNICAL FIELD

The present invention relates to driver distraction monitoring in motor vehicles, and more particularly to a method and apparatus for detecting the head pose of a driver.

BACKGROUND OF THE INVENTION

Each year numerous automobile accidents are caused by vehicle driver distractions. The National Highway Traffic Safety Administration (NHTSA) estimates that driver distraction is directly involved in twenty to thirty percent of all automobile accidents or roughly 1.6 million automobile accidents in the U.S. annually. Visual distraction of the driver is attributed to many of the accidents. For this reason, there has been interest in developing a driver monitoring system for determining if the driver is paying attention to the forward field-of-view. This information can be used to issue an alert if the driver's attention is directed away from the road too long or too often, and possibly to belay other warnings (such as collision-avoidance warnings) if the driver is paying attention to the forward field-of-view. An example of such a monitoring system is Delphi Automotive's Driver State Monitor, which processes a video image of a driver's face to characterize the driver's eye gaze direction (on-road vs. off-road), and to issue an alert if the proportion of off-road eye gaze over a specified period of time exceeds a threshold. However, video processing typically requires high-speed signal processing capabilities, and detection of the driver's eyes can be hampered by various kinds of obstructions (including sunglasses) disposed between the video imager(s) and the driver's face. Accordingly, what is needed is a more reliable and cost-effective way of assessing driver distraction.

SUMMARY OF THE INVENTION

The present invention is directed to an improved method and apparatus for assessing driver distraction in a motor vehicle by capacitively detecting the driver's head pose relative to the forward direction of vehicle motion. A symmetrical array of sensor electrodes is disposed in the cockpit ceiling above the driver's head, and pairs of electrodes disposed along varying axes of rotation with respect to the forward direction are successively activated for capacitance measurement. The capacitance measurements are combined to form a signal whose strength depends on the degree of alignment between the driver's head (i.e., the head pose) and the respective axes of rotation, and the driver's head pose is calculated to assess driver distraction.

DESCRIPTION OF THE PREFERRED EMBODIMENT

The present invention is disclosed herein in the context of a driver distraction system that determines if the driver's attention is directed toward or away from the forward direction of vehicle motion, and that issues a driver alert if the driver's attention is diverted from the forward direction too long or too often. In that context, the present invention provides a capacitive sensing apparatus that simply and reliably determines the driver's head pose (i.e., the rotational orientation of the driver's head) as an indicator of the direction of the driver's attention. However, it will be appreciated that the invention has other applications, both vehicular and non-vehicular.

Figure 1A:
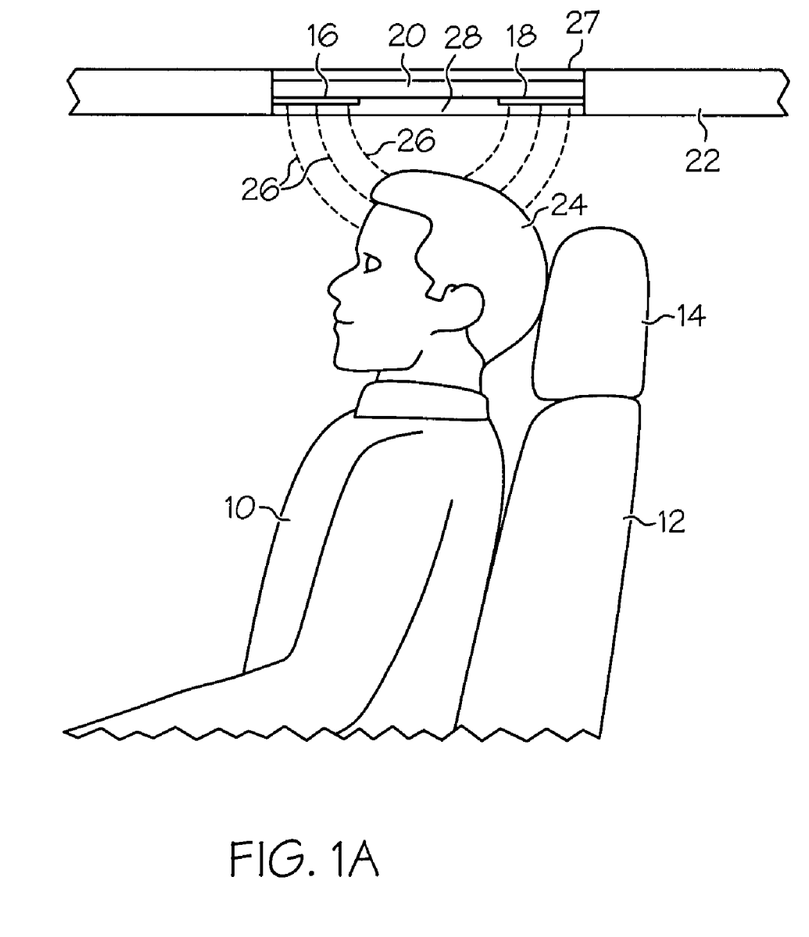
FIG. 1A is a side view of a vehicle driver and a sensor apparatus according to the present invention.

In the illustrated occupant sensing application, the invention is implemented with an array of electrodes positioned in proximity to the driver's head, an AC voltage coupled between one of the electrodes and ground to form an electric field that encompasses the driver's head, and capacitance measuring circuitry coupled to the electrodes for determining the driver's head pose based on the currents capacitively coupled between the electrodes. A preferred mechanization is depicted in FIG. 1A, where the reference numeral 10 generally designates a vehicle driver. The driver 10 is reposed on a seat 12 including a headrest 14, and the electrodes 16 and 18 are formed on a printed circuit board 20 disposed in the ceiling or headliner 22 of the vehicle cabin above the normal location of the driver's head 24. Impressing an AC voltage between one of the electrodes 16, 18 and ground with no driver present produces an electric field extending into the space normally occupied by the driver's head 24, as designated by the electric field lines 26. When the driver 10 is present, the capacitance between electrodes 16 and 18 is affected by the interaction between the applied electric field and the driver's head 24. A ground plane 27 formed on the upper surface of the circuit board 20 shields the electrodes 16, 18 from objects and fields above the electrodes 16, 18.

The AC voltage amplitude that is applied to one of the electrodes 16, 18 is selected to limit the intensity of the electric field to which the driver 10 is exposed (given the AC frequency) while ensuring that the field strength in the vicinity of the driver's head 24 is sufficiently strong to enable reliable capacitance measurements. According to one embodiment, these competing considerations are resolved by providing a dielectric spacer 28 between the electrodes 16, 18 and the interior fabric of headliner 22; the dielectric spacer 28 prevents the drivers' head 24 from getting too close to the electrodes 16, 18, thereby ensuring that the safety standards for human exposure to electric fields are always met at the frequency used. According to another embodiment, the AC voltage amplitude is adaptively adjusted to accommodate the sitting height of the driver. This is achieved by initializing the system at a default AC voltage amplitude chosen to meet the safety standards for human exposure to electric fields at the frequency used, and then estimating the proximity of the driver's head 24 to the electrodes 16, 18 based on a capacitive signal that varies monotonically with the distance between the driver 10 and the electrodes 16, 18. So long as the distance exceeds a minimum value, the AC voltage amplitude can be increased to a distance-dependent level to provide improved noise immunity for capacitance measurement while ensuring that the driver 10 is not exposed to an electric field intensity that exceeds the relevant safety standards. The process of estimating the driver's proximity to the electrodes 16, 18 and then suitably adjusting the AC voltage amplitude is repeated at periodic intervals to account for changes in the driver's sitting height (due to posture, or even driver changes, for example).

Figure 1B:
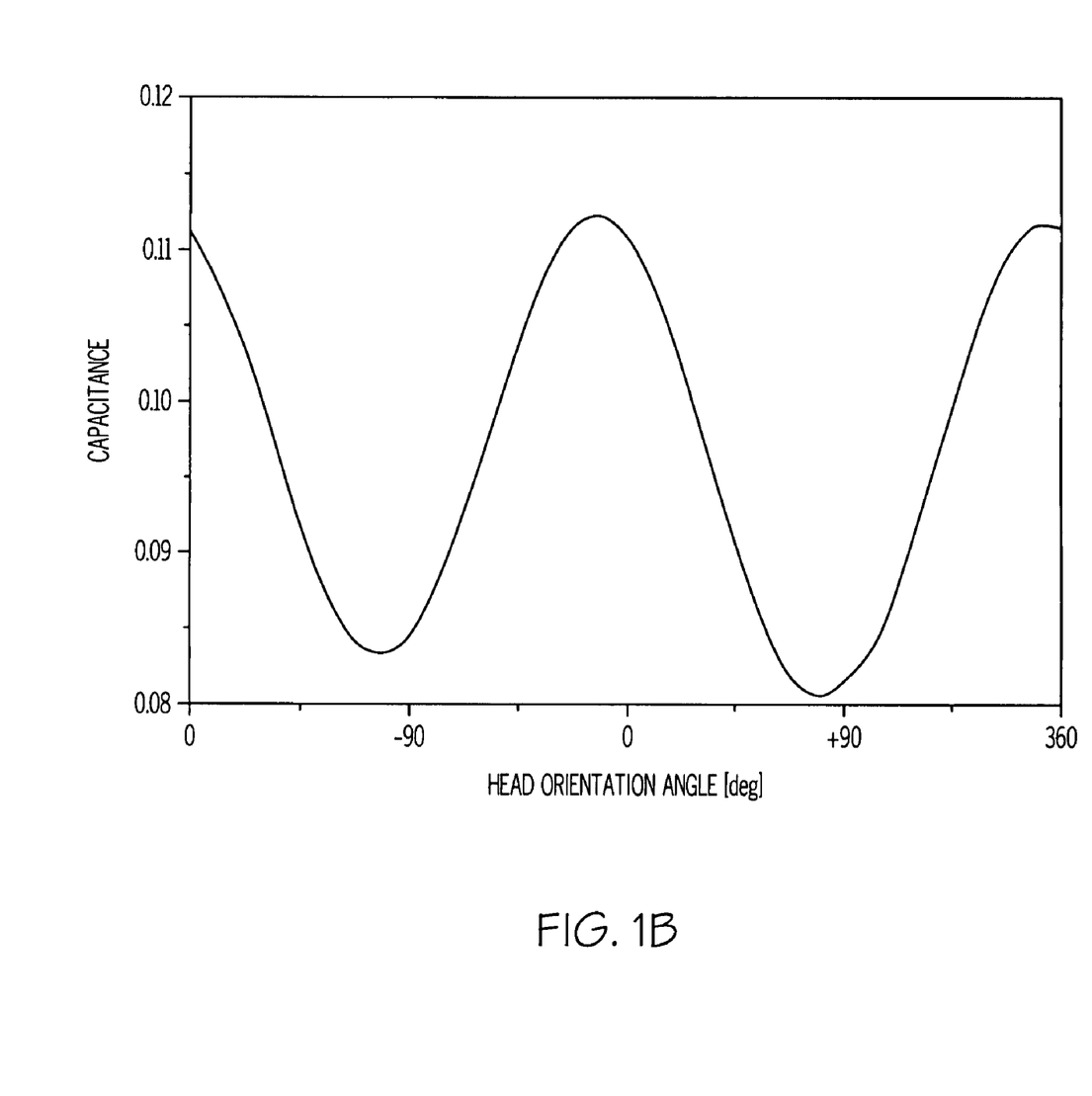
FIG. 1B is a graph depicting a variation in capacitance detected by the sensor apparatus of FIG. 1A as a function of the rotational orientation of the driver's head.

For purposes of electromagnetic analysis, the human head acts like conductive oblong ellipsoid with bilateral symmetry. Accordingly, the degree of coupling between the driver's head 24 and the electric field lines 26, and therefore the capacitive coupling between the electrodes 16 and 18, changes smoothly and symmetrically with the rotational orientation of the drivers' head 24. In fact, the variation in capacitive coupling with rotational orientation is generally sinusoidal as shown in FIG. 1B, where 0° corresponds to the longitudinal axis of the vehicle. However, measured capacitance will also vary with parameters such as the driver's electrical impedance to ground, the distance between the driver's head 24 and circuit board 20, and the lateral and longitudinal offset of the driver 10 with respect to the electrodes 16, 18. The influence of such parameters is minimized according to the present invention by providing an array of sensor electrodes on circuit board 20, as conceptually depicted in FIG. 2A. Various pairs of electrodes disposed along varying axes of rotation with respect to the forward direction are successively activated for capacitance measurement, and the capacitance measurements are combined to form a signal that is proportional to the rotational orientation of the driver's head 24.

Figure 2A:
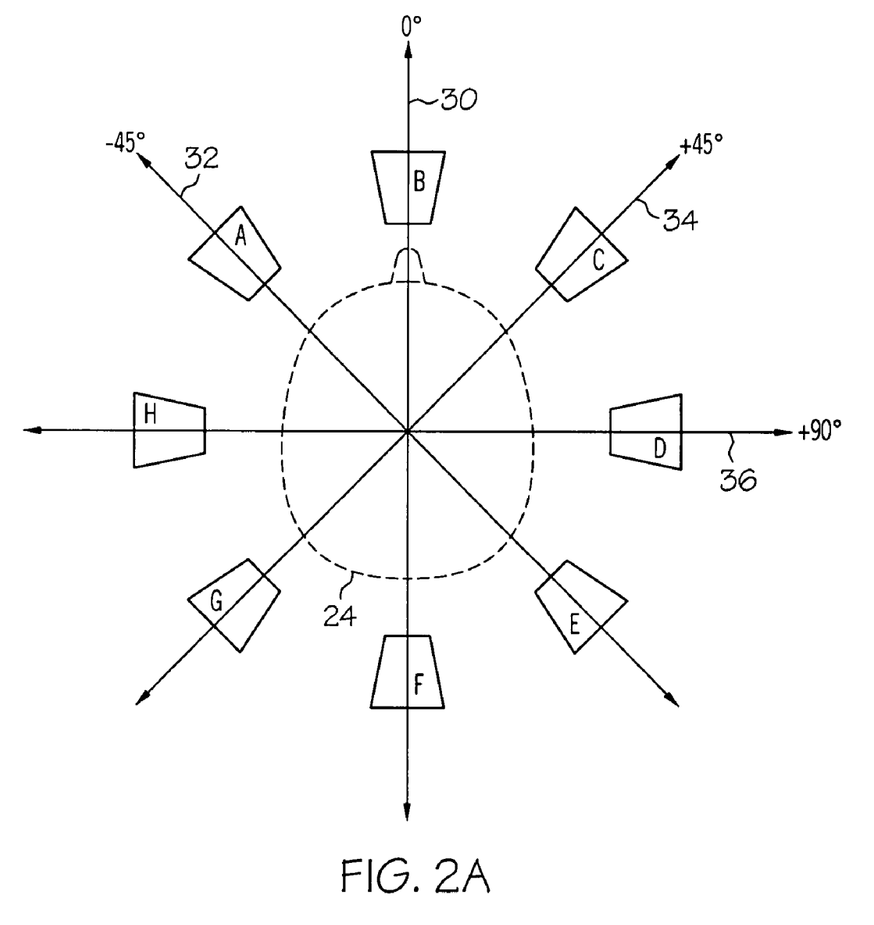
FIG. 2A is a sensor electrode array according to a first embodiment of the present invention.
Figure 2B:
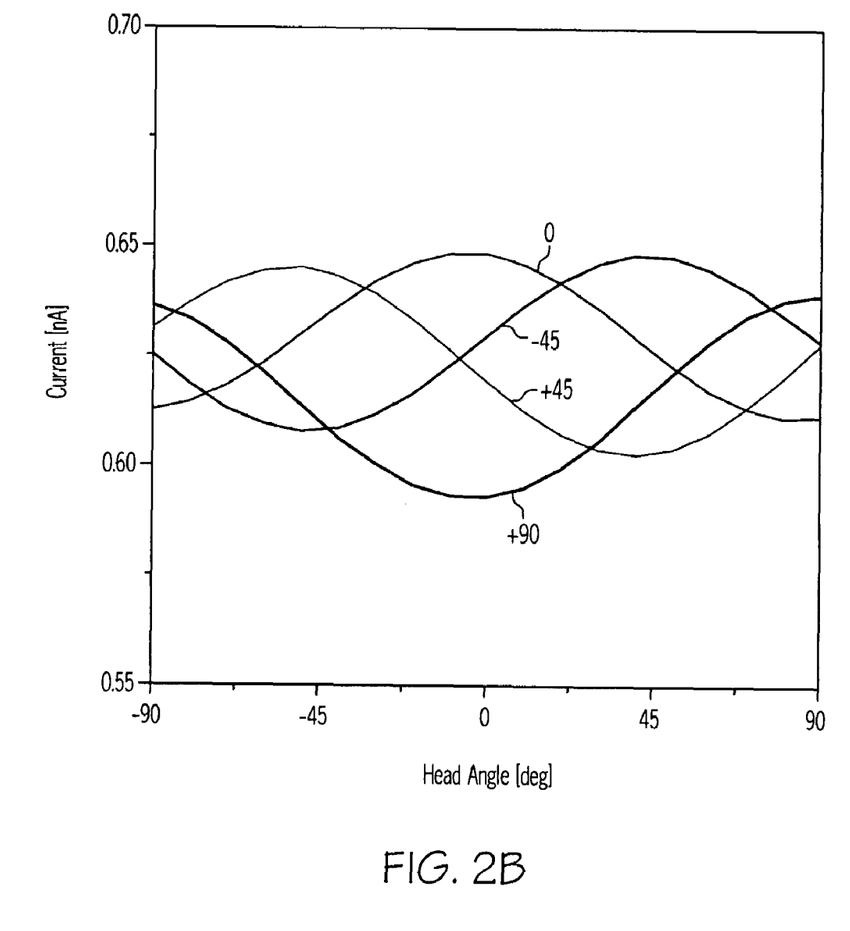
FIG. 2B graphically depicts capacitively coupled currents for the electrode array of FIG. 2A as a function of the rotational orientation of the driver's head when the driver's head is centered with respect to the electrode array.

Referring to FIG. 2A, the circuit board 20 supports a generally circular array of eight spaced electrodes labeled A-H. The electrodes B and F lie on an axis 30 corresponding to the forward direction (0°) of vehicle circular coordinates; the electrodes A and E lie an axis 32 offset from axis 30 by −45°; the electrodes C and G lie an axis 34 offset from axis 30 by +45°; and the electrodes D and H lie an axis 36 offset from axis 30 by +90°. For each successive pair of electrodes, one of the electrodes is coupled to an AC source such as a 30 kHz, 10 Vpp sine wave generator, and the capacitively coupled current between the pair of electrodes is measured as an indication of the electrode-to-electrode capacitance. For any given orientation of the driver's head 24, the measured electrode currents are algebraically represented by the rotational orientation of the corresponding axes 30, 32, 34 and 36 as follows: i(0), i(−45), i(45) and i(90). FIG. 2B graphically depicts the measured currents as a function of the rotational orientation of the driver's head 24 (i.e., head angle) with the driver's head 24 centered with respect to the electrodes A-H. The head angle $\theta_{head}$ may be calculated from i(0), i(−45), i(45) and i(90) according to:

$$\theta_{head} = (90/\pi)\tan^{-1}\{[i(-45)-i(45)]/[i(0)-i(90)]\} \quad (1)$$

For small deviations of $\theta_{head}$ from the forward direction, the numerator term [i(−45)−i(45)] is proportional to $\theta_{head}$. The denominator [i(0)−i(90)] is essentially a scale factor that normalizes the term [i(−45)−i(45)] to cancel the effects of factors such as the shape of the driver's head 24 and its distance from the plane of the electrodes A-H, and the impedance of the driver 10 with respect to ground. Alternately, the head angle $\theta_{head}$ may be expressed in terms of the capacitance values C(0), C(−45), C(45) and C(90) by substituting the capacitance measurements for the corresponding current measurements. Since the driver's head 24 is oriented forward on average, and the capacitance values are continuously sampled, a particularly useful measure of the head angle $\theta_{head}$ is given by:

$$\theta_{head} = (90/\pi)\tan^{-1}\{[[C(-45)-C(45)]-<C(-45)-C(45)>]/[C(0)-C(90)]\} \quad (2)$$

where (C(−45)−C(45)) is the time average of the difference between C(45) and C(−45). While relationships such as those expressed in equations (1) and (2) also hold true if the axes 32 and 34 are symmetrically offset from axis 30 by an angle other than 45°, the offset angle of 45° is preferred because it maximizes the difference [i(−45)−i(45)] or [C(−45)−C(45)]. Also, the axes 32 and 34 can be asymmetrical about axis 30, so long as the asymmetry is properly accounted for in the equation for $\theta_{head}$.

The relationship between $\theta_{head}$ and the capacitively coupled currents of equation (1) or the capacitances of equation (2) ignores the presence of offsets in the measured quantities due to electrode imperfections, vehicle peculiarities, and so on. According to one aspect of the invention, the offsets are determined by performing the same measurements in an empty vehicle, and then subtracted from the measured quantities before $\theta_{head}$ is computed.

Figure 2C:
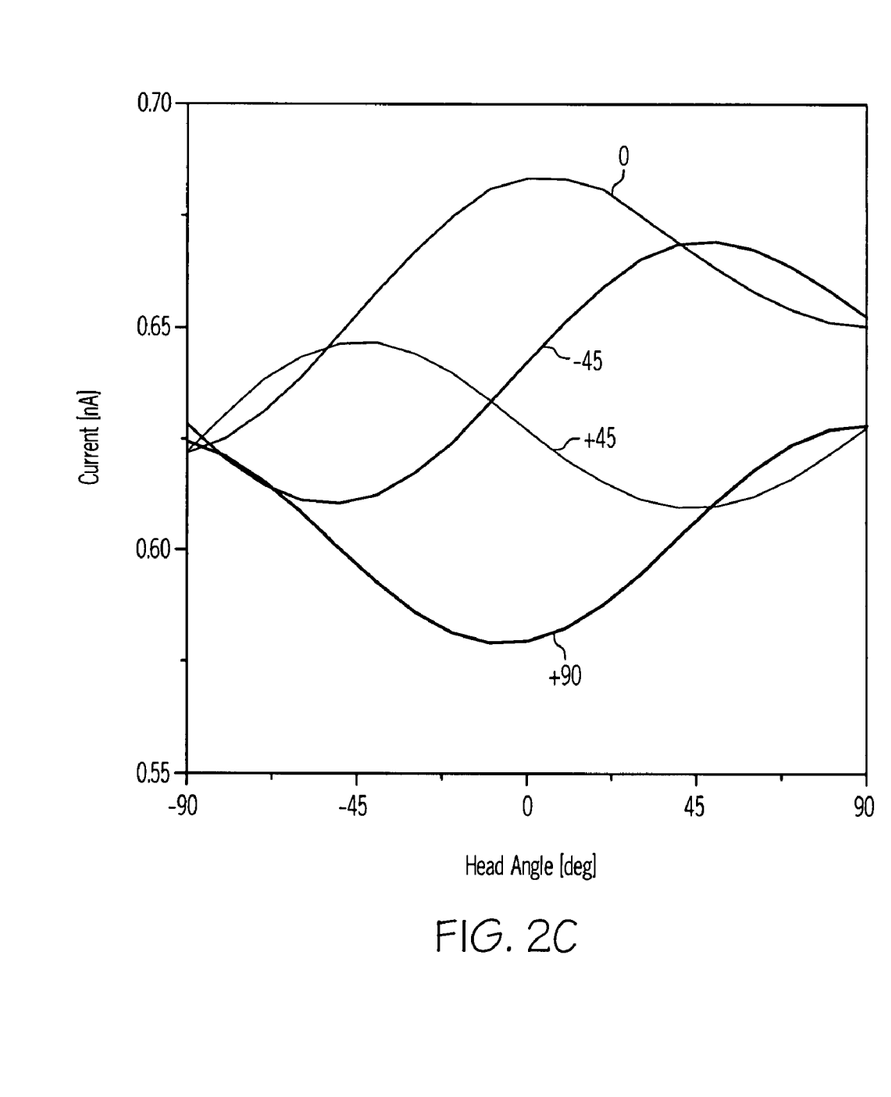
FIG. 2C graphically depicts capacitively coupled currents for the electrode array of FIG. 2A as a function of the rotational orientation of the driver's head when the driver's head is offset with respect to the electrode array.
Figure 2D:
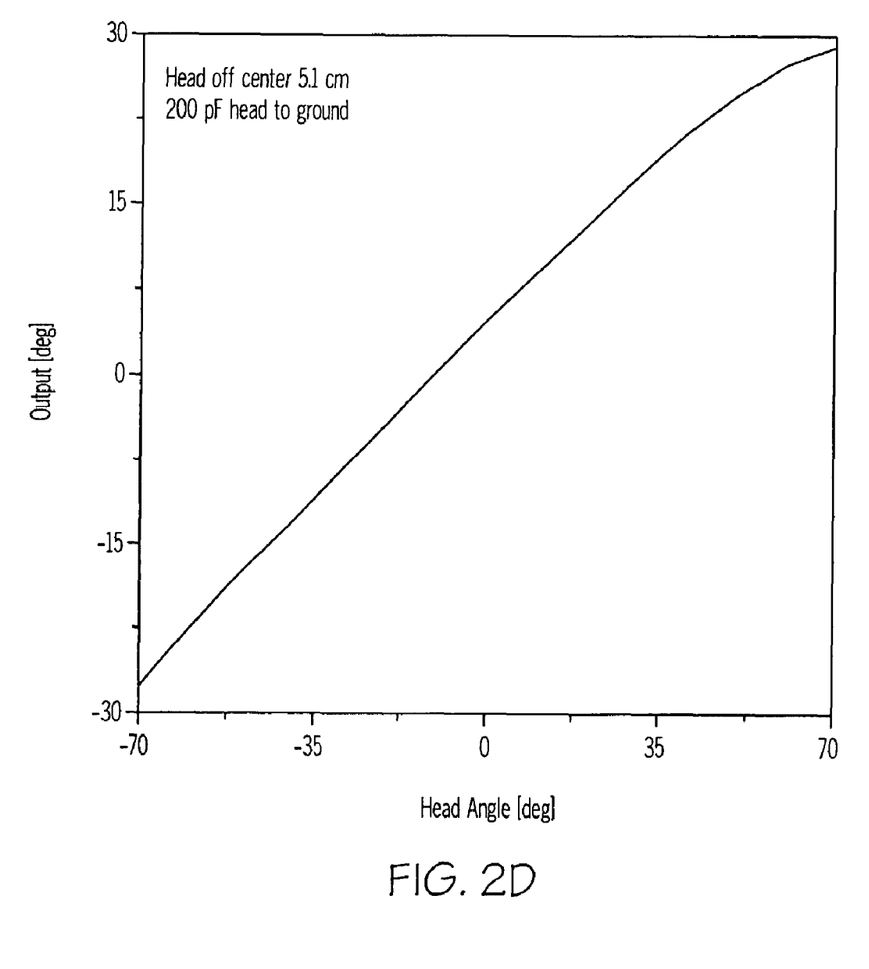
FIG. 2D graphically depicts a computed head angle of the driver based on the capacitively coupled currents of FIG. 2C.

The above expressions for head angle $\theta_{head}$ are essentially insensitive to relatively small fore/aft movements of the driver 10 as typically occur due to seat adjustment or posture, particularly for head rotation angles of, say, 45° or less. This is illustrated by FIGS. 2C and 2D, which respectively depict the capacitively coupled currents i(0), i(45), i(45) and i(90) and the calculated head angle $\theta_{head}$ for a relatively wide range of driver head angles when the driver's head 24 is offset (laterally or fore-aft) with respect to the electrodes A-H by 5.1 cm.

Instead of calculating the head angle $\theta_{head}$ as given in equations (1) or (2), the argument x of the $\tan^{-1}(x)$ function in either equation can be used to simply determine whether $|\theta_{head}|$ exceeds a predetermined value. This simplification is valid as a practical matter because the range of $\theta_{head}$ is relatively limited, and the function $\tan^{-1}(x)$ varies monotonically with x in the range of −90° to +90°.

Yet another approach is to estimate $\theta_{head}$ at somewhat lower resolution by identifying the electrode axis most nearly aligned with the driver' head angle based on the electrode pair exhibiting the greatest capacitive coupling. This may provide sufficient accuracy in applications where it is only necessary to distinguish between on-road gaze and off-road gaze, for example.

Figure 3:
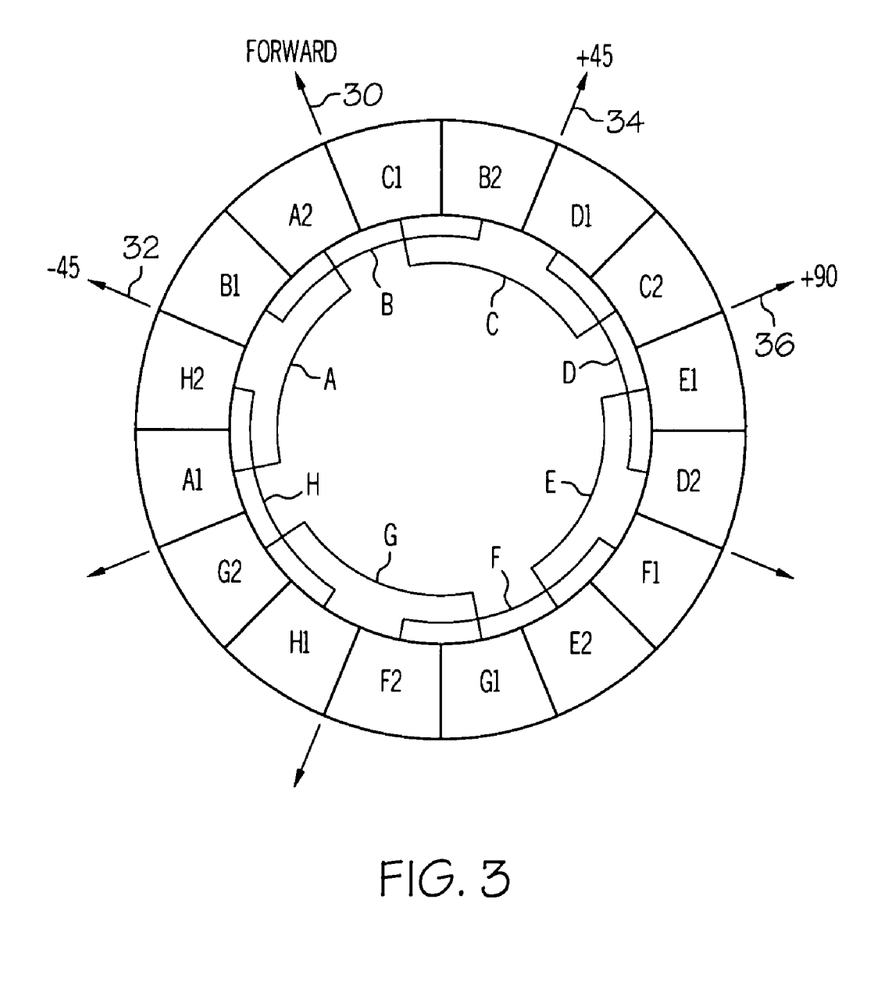
FIG. 3 is a sensor electrode array according to a second embodiment of the present invention.

FIG. 3 depicts a particularly advantageous electrode arrangement for the capacitive sensor of the present invention. In this case, the circuit board 20 supports a generally circular array of sixteen spaced electrodes labeled A1-H1 and A2-H2, with a margin of circuit board 20 between adjacent electrodes. As indicated in FIG. 3, shielded conductors within circuit board 20 interconnect the electrodes designated by the same letter, and terminals A-H are provided for each interconnected electrode pair. In other words, electrodes A1 and A2 are electrically accessible at terminal A, electrodes B1 and B2 are electrically accessible at terminal B, and so on. The difference from the embodiment of FIG. 2A is that the electric fields in this case are established by a pair of electrodes, and the capacitive coupling is measured between oppositely disposed pairs of electrodes. For example, the capacitive coupling along the 0° axis 30 is measured by coupling an AC voltage source to terminal B (or F) to produce an electric field that projects into the vehicle cabin, and detecting the capacitively coupled current between terminals B and F. Likewise, the capacitive coupling along the 45° axis 34 is measured by coupling the AC voltage source to terminal C (or G) to produce the electric field, and detecting the capacitively coupled current between terminals C and G. This arrangement is superior to the arrangement of FIG. 2A in that the produced electric fields are more uniform in intensity across the sensing area, which lessens the sensitivity to lateral and fore-aft positioning of the driver's head 24 relative to the electrode array.

Figure 4:
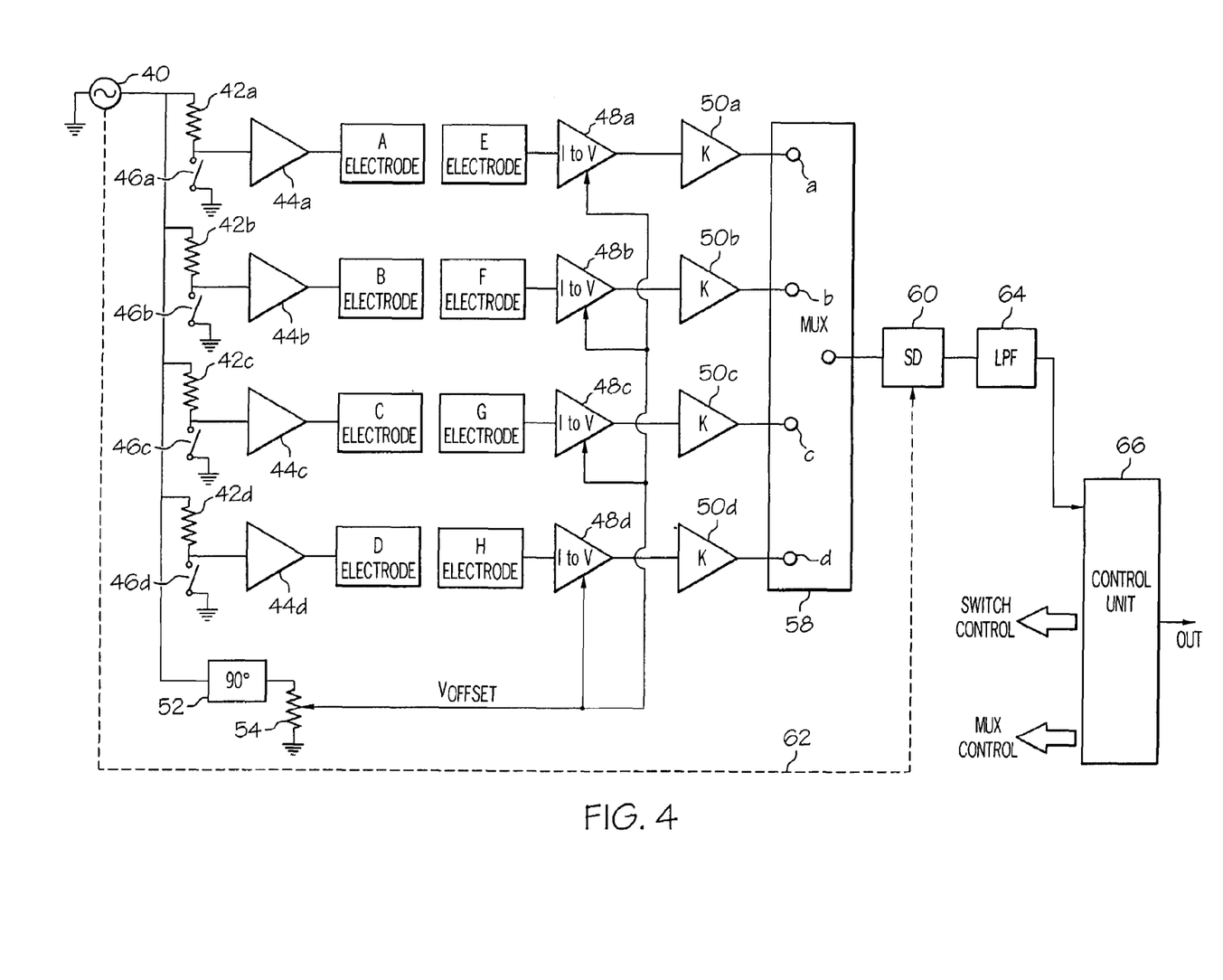
FIG. 4 is a circuit block diagram of the sensor apparatus of FIG. 1A.

FIG. 4 depicts a circuit arrangement for use in connection with the electrode array of FIG. 2A. Of course, the circuit also applies to the electrode array of FIG. 3; in that case, the electrodes A-H are replaced with the terminals A-H of FIG. 3. In any event, the circuit selectively connects a 30 kHz, 10 Vpp AC voltage source 40 to a selected one of the four electrodes A-D (also referred to herein as source electrodes) while grounding the other three source electrodes. The source 40 is coupled to the selected source electrode through a resistor 42a, 42b, 42c, 42d and a low output impedance amplifier 44a, 44b, 44c, 44d. The input of each amplifier 44a, 44b, 44c, 44d is selectively connected to ground by a controlled switch 46a, 46b, 46c, 46d (an FET, for example). The electrodes E-H (also referred to herein as sense electrodes) are each serially coupled to a current-to-voltage converter 48a, 48b, 48c, 48d and an amplifier 50a, 50b, 50c, 50d. In the illustrated embodiment, a phase-shifted offset voltage Voffset is applied to each of the current-to-voltage converters 48a-48d to allow increased gain in the following amplification stage without exceeding the range of the signal processing circuitry, thereby increasing the circuit's resolution to changes in capacitance. Phase-shifter 52 changes the phase of the source voltage by 90° to match the phase of the detected current, and the potentiometer 54 operates as a voltage divider to form the offset voltage Voffset. In practice, the potentiometer setting is selected based on the need to keep the analog outputs of current-to-voltage converters 48a-48d within the analog-to-digital conversion range of control unit 66. The analog voltage outputs of amplifiers 50a, 50b, 50c, 50d are supplied as inputs a, b, c, d to a multiplexer 58, which supplies a selected one of its inputs to the synchronous detector 60. The synchronous detector 60 also receives a quadrature reference signal 62 from AC source 40, and detects components of the detected voltage signals that are in phase with the reference signal 62. The output of synchronous detector 60 is low-pass filtered by filter 64, and provided as an input to control unit 66, which may be a microprocessor for example. As indicated, the control unit 66 controls both the switches 46a-46d and the multiplexer 58. A more detailed disclosure of the sensing circuit is presented in the U.S. Pat. No. 6,469,524 to Oberdier, incorporated herein by reference.

In operation, the control unit 66 controls the switches 46a-46d and the multiplexer 58 to successively select the various pairs A/E, B/F, C/G, D/H of electrodes and obtain the corresponding capacitance values C(−45), C(0), C(+45), C(90). For example, the capacitive response along the 0° axis 30 is determined by opening the switch 46b, closing the switches 46a, 46c and 46d, and selecting input b of multiplexer 58. Once the capacitance (or current) values have been adequately sampled, the control unit 66 calculates the head angle $\theta_{head}$ and supplies it to a driver distraction system, or the like.

In an alternate configuration, the electrodes A-H can be located in a manner to respond to a different plane of the driver's head 24. For example, the source (or sense) electrodes may be located behind the driver's head (such as in the headrest 14 of seat 12), and the sense (or source) electrodes may be located in an area above and forward of the driver's head 24.

In summary, the present invention provides a reliable and cost-effective way of capacitively detecting a driver's head pose relative to the forward direction. The detected pose is substantially insensitive to typical variations in the position of the driver 10 and the driver's impedance to ground, and good performance is achievable with electric field intensity levels well below those specified in the applicable IEEE safety standards.

While the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. An apparatus for detecting a pose of a human subject's head, comprising:
   a symmetrically arranged array of electrodes including at least first and second electrodes disposed in relation to the subject's head;
   an AC voltage source;
   switch means for selectively coupling said AC voltage source to said first electrode to generate an electric field that interacts with the subject's head; and
   processing means for determining a capacitive coupling between said first and second electrodes while said AC voltage source is coupled to said first electrode, detecting the pose of the subject's head based on the determined capacitive coupling, setting an amplitude of said AC voltage source to a default value, determining a proximity of the subject's head to said electrodes, and adjusting the amplitude of said AC voltage source based on the determined proximity.

2. The apparatus of claim 1, wherein said human subject is a driver of a vehicle, and said array of electrodes are disposed in a ceiling of said vehicle in alignment with a region normally occupied by the subject's head.

3. The apparatus of claim 1, wherein said human subject is a driver of a vehicle, and at least one electrode is disposed in a ceiling of said vehicle and at least one other electrode is disposed in a headrest of a seat on which the subject is reposed.

4. The apparatus of claim 1, wherein said symmetrically arranged array of electrodes includes multiple pairs of electrodes disposed along varying axes of rotation with respect to a forward-facing direction of said subject, and said switch means successively couples said AC voltage source to an electrode of each such pair or electrodes for detecting the pose of said subject's head based on a capacitive coupling between the electrodes of each such pair of electrodes.

5. The apparatus of claim 4, wherein said array of electrodes comprises a pair of electrodes disposed along four axes of rotation with respect to said forward-facing direction.

6. The apparatus of claim 5, wherein said four axes of rotation are substantially 0°, +90°, +45° and −45°.

7. The apparatus of claim 5, wherein each pair of said electrodes comprises electrodes oppositely disposed about the respective axis of rotation.

8. The apparatus of claim 1, further comprising:
   a printed circuit board supporting said array of electrodes and a ground plane, said array of electrodes being disposed between said ground plane and the subject's head.

9. The apparatus of claim 1, further comprising:
a printed circuit board supporting said array of electrodes; and
a dielectric spacer disposed between said array of electrodes and the subject's head.

10. A method of detecting a pose of a human subject's head, comprising the steps of:
providing a symmetrically arranged array of electrodes in relation to the subject's head, including at least first and second electrodes;
selectively coupling an AC voltage source to said first electrode to generate an electric Field that interacts with the subject's head;
determining a capacitive coupling between said first and second electrodes while said AC voltage source is coupled to said first electrode; and
detecting a pose of the subject's head based on the determined capacitive coupling;
setting an amplitude of said AC voltage source to a default value;
determining a proximity of the subject's head to said electrodes; and
adjusting the amplitude of said AC voltage source based on the determined proximity.

11. The method of claim 10, including the steps of:
providing multiple pairs of symmetrically arranged array of electrodes disposed along varying axes of rotation with respect to a forward-facing direction of said subject;
successively coupling said AC voltage source to an electrode of each pair of electrodes while determining a capacitive coupling between that pair of electrodes; and
detecting the pose of said subject's head based on the determined capacitive coupling between the pairs of electrodes.

12. The method of claim 11, wherein the varying axes of rotation include a first and a second axes of rotation oppositely disposed about a forward-facing direction of said subject.

13. The method of claim 12, including the step of:
detecting the pose of the subject's head in relation to a first difference between the capacitive coupling associated with said first and said second axes of rotation.

14. The method of claim 13, wherein the varying axes of rotation include a third axis of rotation in alignment with said forward-facing direction and a fourth axis of rotation perpendicular to said forward-facing direction.

15. The method of claim 14, including the steps of:
determining a second difference between the capacitive coupling associated with said third and said fourth axes of rotation; and
normalizing said first difference based on said second difference to compensate the detected pose for extraneous factors that affect the determined capacitive coupling.

16. The method of claim 11, including the step of:
detecting the pose of said subject's head based on the axis of rotation having the highest capacitive coupling.

17. The method of claim 10, including the step of:
periodically repeating the steps of determining the proximity of the subject's head to said electrodes and adjusting the amplitude of said AC voltage source based on the determined proximity.

* * * * *